(12) United States Patent
Kamiya

(10) Patent No.: US 10,994,608 B2
(45) Date of Patent: May 4, 2021

(54) VEHICULAR ELECTRIC OIL PUMP DEVICE

(71) Applicant: TOYOTA JIDOSHA KABUSHIKI KAISHA, Toyota (JP)

(72) Inventor: Toshihiko Kamiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 16/388,954

(22) Filed: Apr. 19, 2019

(65) Prior Publication Data

US 2019/0323566 A1    Oct. 24, 2019

(30) Foreign Application Priority Data

Apr. 19, 2018  (JP) .............................. JP2018-080929

(51) Int. Cl.
| | |
|---|---|
| *F16H 61/00* | (2006.01) |
| *B60K 17/344* | (2006.01) |
| *F16N 13/06* | (2006.01) |
| *F01M 1/02* | (2006.01) |
| *F16H 57/04* | (2010.01) |

(52) U.S. Cl.
CPC ....... *B60K 17/344* (2013.01); *F16H 61/0031* (2013.01); *F16N 13/06* (2013.01); *F01M 2001/0215* (2013.01); *F16H 57/0436* (2013.01); *F16N 2013/063* (2013.01); *F16N 2210/12* (2013.01)

(58) Field of Classification Search
CPC .......... B60K 17/344; B60K 2023/0858; B60K 2023/0825; B60K 23/08; B60K 2025/005; F16H 61/0031; F16H 57/0441; F16H 61/0003; F16H 57/0436; F16N 13/06; F16N 2013/063; F16N 2210/12; F16N 2260/00; F01M 2001/0215; F01M 1/18
See application file for complete search history.

(56) References Cited

U.S. PATENT DOCUMENTS

| | | | |
|---|---|---|---|
| 8,694,214 B2 | 4/2014 | Muller et al. | |
| 2007/0265129 A1* | 11/2007 | Kasuya | B60K 6/445 475/32 |
| 2010/0151993 A1* | 6/2010 | Ike | F16H 61/0025 477/138 |

(Continued)

FOREIGN PATENT DOCUMENTS

JP        2013-189992 A       9/2013

*Primary Examiner* — David J Hlavka
(74) *Attorney, Agent, or Firm* — Oliff PLC

(57) ABSTRACT

In an electric oil pump device including a drive power source and a gear device through which a vehicle drive force of the drive power source is transmitted, the electric oil pump device delivering a lubricant oil to the gear device, and generating a hydraulic pressure for controlling the gear device, a pump portion for delivering the lubricant oil, a motor portion for operating the pump portion, and a driver portion for controlling an operation of the motor portion are included. The pump portion, motor portion and driver portion are formed integrally with each other, or the driver portion is disposed adjacent to the motor portion. The pump portion and a part or an entirety of the motor portion are disposed within a space defined by an oil pan and a casing accommodating the gear device, and the driver portion is disposed outside the casing and the oil pan.

4 Claims, 4 Drawing Sheets

(56) References Cited

U.S. PATENT DOCUMENTS

| | | | |
|---|---|---|---|
| 2010/0242669 A1* | 9/2010 | Komizo | F16H 57/02 74/606 R |
| 2014/0091023 A1* | 4/2014 | Long | F16N 7/36 210/167.08 |
| 2015/0167833 A1* | 6/2015 | Jo | F16H 61/0028 137/565.14 |

* cited by examiner

VEHICULAR ELECTRIC OIL PUMP DEVICE

This application claims priority from Japanese Patent Application No. 2018-080929 filed on Apr. 19, 2018, the disclosure of which is herein incorporated by reference in its entirety.

FIELD OF THE INVENTION

The present invention relates to a vehicular electric oil pump device functioning to deliver a lubricant oil to a gear device which has a plurality of operating positions and through which a drive force of a drive power source of a vehicle is transmitted, and to generate a hydraulic pressure for controlling the gear device to be shifted to a selected one of the operating positions.

BACKGROUND OF THE INVENTION

There is known an electric oil pump device including a pump portion for delivering a pressurized lubricant oil, a motor portion for operating the pump portion, and a driver portion for controlling an operation of the motor portion. The electric oil pump is disposed within an oil pan in which the lubricant oil is stored. U.S. Pat. No. 8,694,214 (U.S. Pat. No. 8,694,214 B2) discloses an example of such a vehicular electric oil pump device.

Where the electric oil pump device in which the driver portion for controlling the operation of the motor portion is assembled integrally with the pump portion and the motor portion is disposed within the oil pan, the electric oil pump device is exposed to heat of the lubricant oil within the oil pan. Where semiconductor elements and other electronic components incorporated in the driver portion have low degrees of heat resistance, the electric oil pump device has a risk of operating failure. This risk can be reduced by providing the driver portion with the electronic components having high degrees of heat resistance. However, the use of these highly heat-resistant electronic components results in a rise of a cost of manufacture of the electric oil pump device. Where the electric oil pump device is installed in an outside space outside the oil pan and a casing in which the gear device is accommodated, on the other hand, it is difficult to secure the outside space in which an entirety of the electric oil pump device can be installed. Further, the provision of this outside space is undesirable to meet a need for space saving of the vehicle.

SUMMARY OF THE INVENTION

The present invention was made in view of the background art described above. It is therefore an object of the present invention to provide an electric oil pump device in which the driver portion for controlling the operation of the motor portion is assembled integrally with the pump portion and the motor portion or disposed adjacent to the motor portion, and is less likely to be exposed to heat of the lubricant oil within the oil pan, and which requires a reduced space for installation.

The object indicated above is achieved according to the following modes of the present invention:

According to a first mode of the invention, there is provided an electric operated oil pump device for a vehicle including a drive power source and a gear device through which a vehicle drive force of the drive power source is transmitted, the electric oil pump device delivering a lubricant oil to the gear device, and generating a hydraulic pressure for controlling the gear device, the electric oil pump device comprising: a pump portion for delivering the lubricant oil; a motor portion for operating the pump portion; and a driver portion for controlling an operation of the motor portion, wherein the pump portion, the motor portion and the driver portion are formed integrally with each other, or the driver portion is disposed adjacent to the motor portion. The electric oil pump device is characterized in that the pump portion and a part or an entirety of the motor portion are disposed within a space defined by an oil pan and a casing which accommodates the gear device, and in that the driver portion is disposed in an outside space outside the casing and the oil pan.

According to a second mode of the invention, the electric oil pump device according to the first mode of the invention is configured such that the driver portion is disposed in a part of the outside space outside the casing and the oil pan, which part is located upwardly of the oil pan and sideways of the gear device.

According to a third mode of the invention, the electric oil pump device according to the first or second mode of the invention is configured such that the driver portion is disposed in a part of the outside space outside the casing and the oil pan, which part is located between the casing and a front propeller shaft to which the vehicle drive force is transmitted from the gear device.

The electric oil pump device according to the first mode of the invention for the vehicle including the drive power source and the gear device through which the vehicle drive force of the drive power source is transmitted is provided to deliver the lubricant oil to the gear device, and to generate the hydraulic pressure for controlling the gear device. The electric oil pump device includes the pump portion for delivering the lubricant oil, the motor portion for operating the pump portion, and the driver portion for controlling the operation of the motor portion. The pump portion, the motor portion and the driver portion are formed integrally with each other, or the driver portion is disposed adjacent to the motor portion. The pump portion and a part or the entirety of the motor portion are disposed within the space defined by the oil pan and the casing which accommodates the gear device, while the driver portion is disposed in the outside space outside the casing and the oil pan. Accordingly, a volume of a part of the electric oil pump device which is located in the above-indicated outside space can be reduced, so that a need for space saving of the vehicle can be met. In addition, the driver portion disposed in the outside space outside the casing and the oil pan is less likely to be exposed to heat of the lubricant oil stored within the oil pan, so that a requirement of the electric oil pump device to use costly high heat-resistant electronic components is reduced, whereby the cost of manufacture of the electric oil pump device can be reduced.

According to the second mode of the invention, the electric oil pump device according to the first mode of the invention is configured such that the driver portion is disposed in the part of the outside space outside the casing and the oil pan, which part is located upwardly of the oil pan and sideways of the gear device. Accordingly, the electric oil pump device can be installed on the vehicle, by utilizing a space which tends to be a dead space for installation of the drive power source and the gear device on the vehicle.

According to the third mode of the invention, the electric oil pump device according to the first mode of the invention is configured such that the driver portion is disposed in the part of the outside space outside the casing and the oil pan, which part is located between the casing and the front propeller shaft to which the vehicle drive force is transmitted from the gear device. In a 4-wheel-drive vehicle provided with the front propeller shaft, in particular, the space between the front propeller shaft and the casing tends to be a dead space. In the present third mode of the invention, however, this space can be effectively utilized for installation of the electric oil pump device.

DETAILED DESCRIPTION OF A PREFERRED EMBODIMENT

A preferred embodiment of the present invention will be described in detail by reference to the drawings. It is to be understood that the drawings showing the embodiments are simplified or transformed as needed, and do not necessarily accurately represent dimensions and shapes of various elements of the embodiment.

Embodiment

Figure 1:
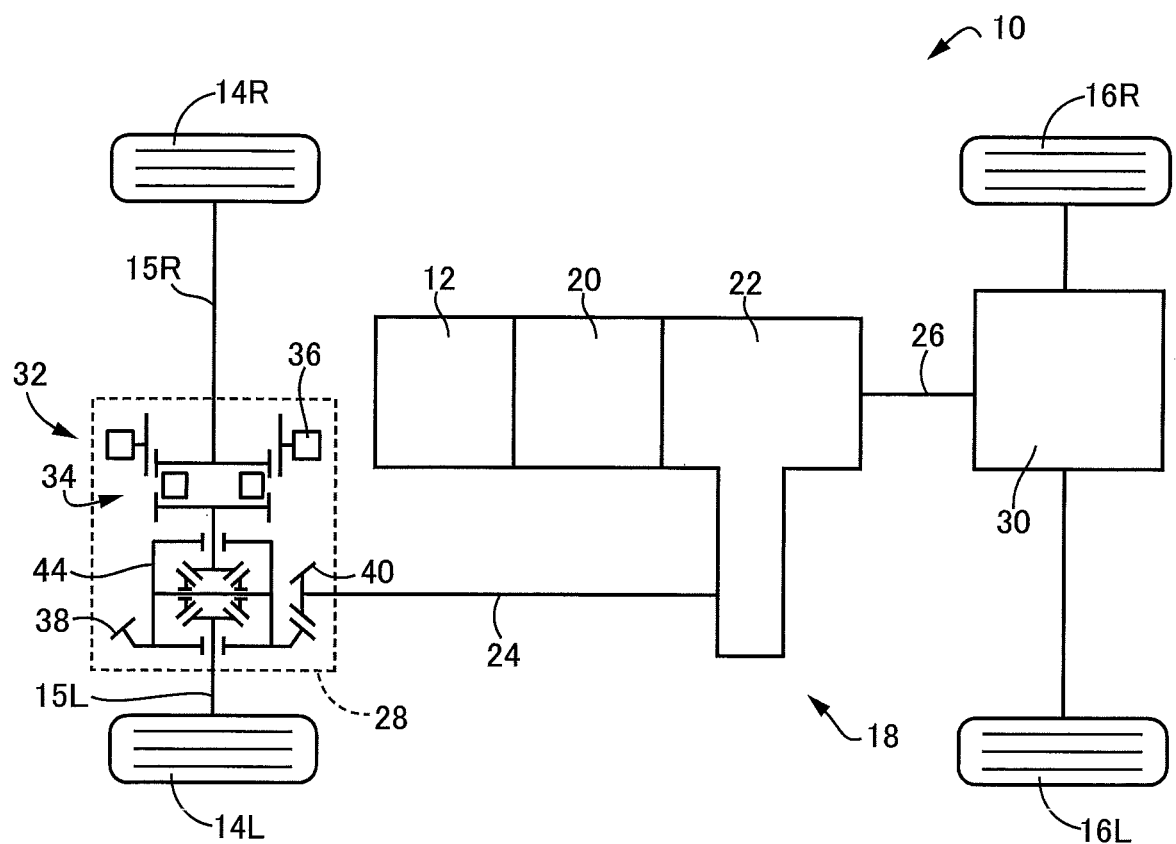
FIG. 1 is a schematic view showing an arrangement of a vehicle provided with an electric oil pump device according to one embodiment of this invention.

Reference is first made to FIG. 1 which is the schematic view showing an arrangement of a vehicle 10 provided with an electric oil pump device 50 according to a preferred embodiment of the invention. As shown in FIG. 1, the vehicle 10 includes: a drive power source in the form of an engine 12; left and right front wheels 14L and 14R (hereinafter referred to simply as "front wheels 14", unless otherwise specified); left and right rear wheels 16L and 16R (hereinafter referred to simply as "rear wheels 16", unless otherwise specified); and a power transmitting system 18 through which a drive force of the engine 12 is transmitted to the front wheels 14 and the rear wheels 16. The rear wheels 16 are primary drive wheels to be driven in both of a 2-wheel drive mode (2WD mode) and a 4-wheel drive mode (4WD mode), while the front wheels 14 are auxiliary drive wheels which are idler wheels in the 2WD mode, and driving wheels to be driven in the 4WD mode. That is, the vehicle 10 is a part-time 4WD vehicle based on a FR (front-engine rear-wheel drive) type vehicle.

As shown in FIG. 1, the power transmitting system 18 includes: a gear device in the form of a transmission 20 operatively connected to the engine 12; a front/rear drive force distributing device in the form of a transfer 22 operatively connected to the transmission 20; a front propeller shaft 24 and a rear propeller shaft 26 which are operatively connected to the transfer 22; a front-wheel differential gear device 28 operatively connected to the front propeller shaft 24; and a rear-wheel differential gear device 30 operatively connected to the rear propeller shaft 26. In the power transmitting system 18 constructed as described above, the drive force of the engine 12 transmitted to the transfer 22 through the transmission 20 is transmitted to the rear wheels 16 through a rear power transmitting path, that is, through the rear propeller shaft 26 and the rear-wheel differential gear device 30. Further, a portion of the drive force of the engine 12 is distributed by the transfer 22 to the front wheels 14, and transmitted to the front wheels 14 through a front power transmitting path, that is, through the front propeller shaft 24 and the front-wheel differential gear device 28. The transfer 22 also functions to place the front power transmitting path in a power cutoff state upon switching of the power transmitting system 18 from the 4WD mode to the 2WD mode.

The drive force distributed by the transfer 22 to the front power transmitting path is transmitted to the front-wheel differential gear device 28 through the front propeller shaft 24. The front propeller shaft 24 is provided at one of its axial ends with a drive pinion 40 in the form of a bevel gear. The drive pinion 40 is held in meshing engagement with a ring gear 38 in the form of a bevel gear of the front-wheel differential gear device 28. This ring gear 38 is fixed to a differential casing 44, and is rotated together with the differential casing 44, about an axis of front-wheel axles 15L and 15R (hereinafter referred to simply as "axles 15", unless otherwise specified). The front-wheel differential gear device 28 is provided with a so-called ADD (Automatic Disconnecting Differential) mechanism 32 in operative connection with the front-wheel axles 15 (more specifically, the front-wheel axle 15R). This ADD mechanism 32 is configured to switch the front-wheel differential gear device 28 between a locking state and a free state.

The ADD mechanism 32 includes a positive clutch 34 and a motor 36, and is switchable between a power transmitting state and a power cutoff state. In the power transmitting state, the drive force is transmitted to the front-wheel axles 15R and 15L. In the power cutoff state, the drive force is not transmitted to the front-wheel axles 15R and 15L. The positive clutch 34 is a known dog clutch, for instance, and functions as a power connecting/disconnecting device for selectively connecting and disconnecting the front-wheel differential gear device 28 to and from the right front wheel 14R. Namely, the front-wheel differential gear device 28 is disconnected from the right front wheel 14R when the positive clutch 34 is placed in a released state, and is connected to the right front wheel 14R when the positive clutch 34 is placed in an engaged state. In the 2WD mode, the positive clutch 34 is placed in the released state so that the front-wheel differential gear device 28 is disconnected from the right front wheel 14R. In the 2WD mode, the ADD mechanism 32 is placed in the power cutoff state, and the transfer 22 is accordingly placed in the power cutoff state in which the drive force is not transmitted to the front-wheel differential gear device 28.

Figure 2:
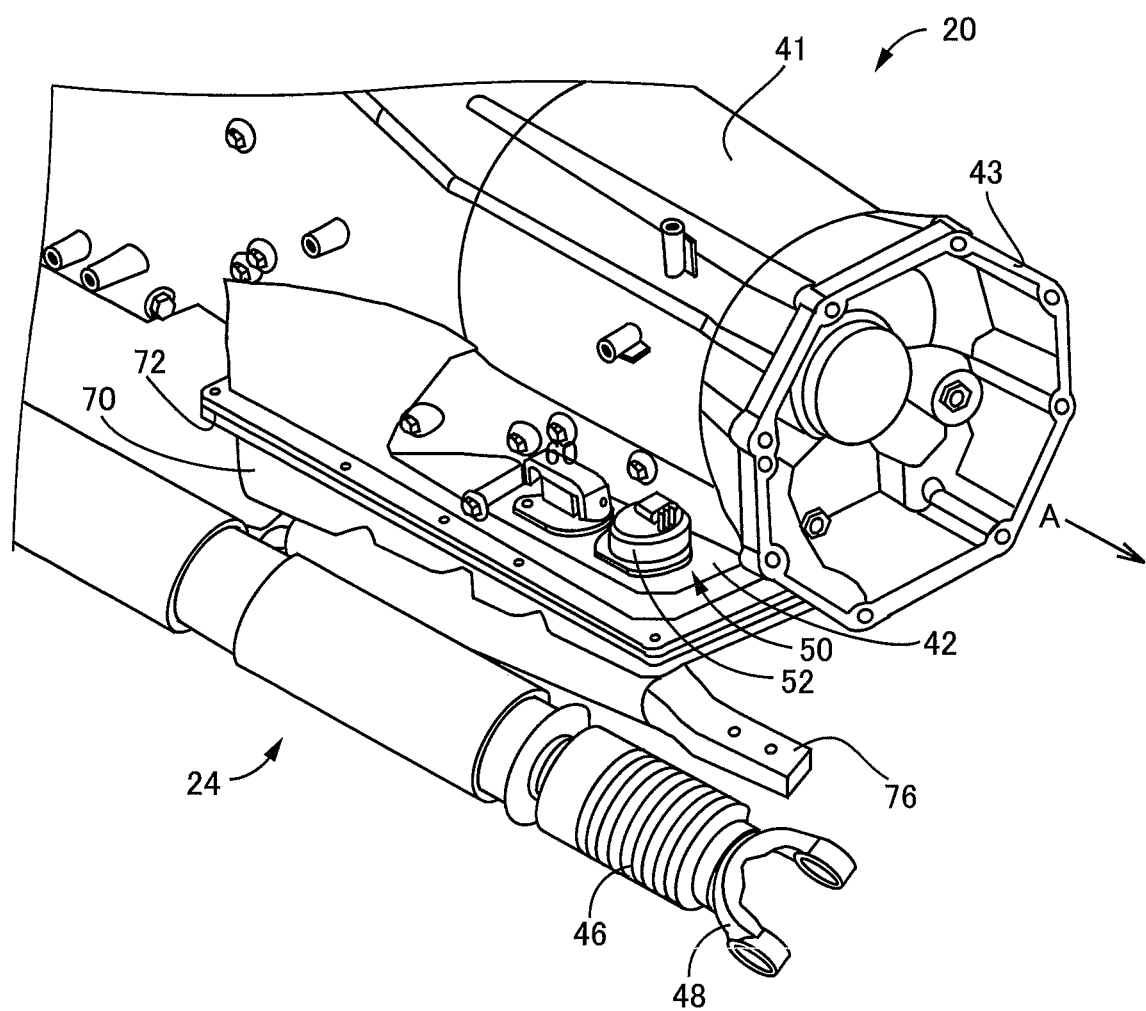
FIG. 2 is a schematic perspective view showing a gear device, the electric oil pump device and a front propeller shaft of the vehicle shown in FIG. 1.

FIG. 2 is the view showing a casing 41 of the transmission 20, and other components of the vehicle 10 adjacent to the casing 41. The casing 41 accommodates known gears and planetary gear sets, and known clutches for selectively connecting and disconnecting the gears and rotary elements of the planetary gear sets to and from each other, to shift the transmission 20 to a selected one of its operating positions. The casing 41 of the transmission 20 has a contact surface 43 held in contact with a contact surface (not shown) of the transfer 22, and the casing 41 and the transfer 22 are fastened to each other with bolts or any other fastening means. The casing 41 is provided with a flange portion 42 extending horizontally from a lower portion of the casing 41. An oil pan 70 having a rectangular mounting surface is assembled with the flange portion 42 such that the mounting surface is fluid-tight contact with a lower surface of the flange portion 42. On the flange portion 42, there is mounted the electric oil pump device 50 which delivers a lubricant oil to the gears and the planetary gear sets accommodated within the casing 41, and which generates a hydraulic pressure for controlling the clutches to shift the transmission 20 to the selected operating position. The electric oil pump device 50 shown in FIG. 3 includes a driver portion 52 extending upwardly from and exposed outside the flange portion 42 of the casing 41 of the transmission 20, and other portions accommodated within a space defined by the flange portion 42 and the oil pan 70. The engine 12 is located at a left and upper position as seen in FIG. 2, namely, on one side of the transmission 20 remote from the transfer 22. The transmission 20 has a smaller diameter than the engine 12 and the transfer 22, so that there is provided a comparatively ample space near or around the transmission 20, in which other members such as hydraulic piping components can be installed. Since the portions of the electric oil pump device 50 other than the driver portion 52 are accommodated within the space defined by the flange portion 42 and the oil pan 70, the above-indicated space around the transmission 20 can be efficiently utilized as a space accommodating the other members such as the hydraulic piping components. In this respect, it is noted that even where the driver portion 52 formed independently of a motor portion 54 of the electric oil pump device 50 is disposed adjacent to the motor portion 54 via a spacer member, for instance, the space around the transmission 20 can be efficiently utilized as the space accommodating the other members such as the hydraulic piping components, because the portions of the electric oil pump device 50 other than the driver portion 52 are accommodated within the space defined by the flange portion 42 and the oil pan 70.

The casing 41 has a contact surface 72 held in contact with the oil pan 70, and the casing 41 and the oil pan 70 are fastened to each other with screws or any other fastening means. The oil pan 70 stores the lubricant oil which is used to lubricate the gears and the planetary gear sets accommodated within the transmission 20, and also used as a working oil for shifting the transmission 20 to the selected operating position. The "working oil" is also referred to as the "lubricant oil". Under the oil pan 70, there is disposed a protective member 76 for preventing deformation of the oil pan 70 due to a stress applied thereto. The front propeller shaft 24 is connected, at one of its opposite axial ends and through a yoke 48, to a front-wheel drive output shaft of the transfer 22 which extends in a direction indicated by an arrow-headed line in FIG. 2. Further, the front propeller shaft 24 is connected, at the other axial end remote from the transfer 22, to the front-wheel differential gear device 28. The yoke 48 is a part of a known universal joint functioning to permit transmission of a rotary motion from the transmission 20 and the transfer 22 to the front-wheel differential gear device 28, even when the front-wheel differential gear device 28 is oscillated in the vertical direction relative to the transmission 20 and the transfer 22 which are fixed to a body of the vehicle 10. The front propeller shaft 24 includes a spline coupling portion (not shown) which is covered by a sealing member 46. This spline coupling portion functions to absorb a variation of a distance between the front-wheel differential gear device 28 and transfer 22, which may be caused due to a movement of the front-wheel differential gear device 28 in the longitudinal direction of the vehicle 10. The sealing member 46 prevents exposure of the spline coupling portion to foreign matters. In the four-wheel drive vehicle 10 provided with the front propeller shaft 24, the members such as the hydraulic piping components other than the electric oil pump device 50 are difficult to be disposed in the space near the transmission 20 and between the transmission 20 and the front propeller shaft 24. In the present embodiment wherein the electric oil pump device 50 is disposed within this space, the other space can be efficiently utilized to accommodate the other members.

Figure 3:
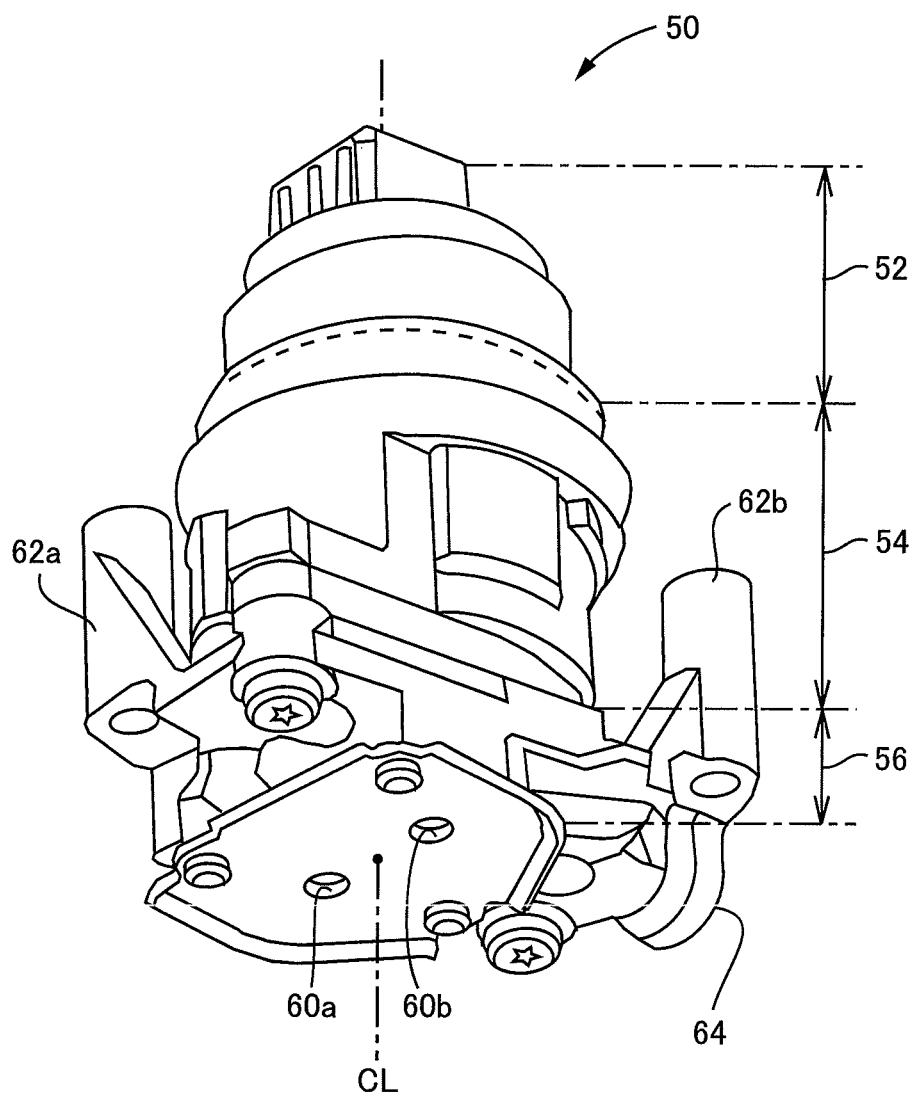
FIG. 3 is an enlarged perspective view showing the electric oil pump device of FIG. 2.

FIG. 3 is the perspective view of the electric oil pump device 50 as seen in an upward direction. The electric oil pump device 50 is a one-piece oil pump device consisting of not only the above-indicated driver portion 52, but also a pump portion 56 and the above-indicated motor portion 54, which are integral with each other. The pump portion 56 has two suction ports 60a and 60b and a delivery port 64. The pump portion 56 sucks the lubricant oil from the oil pan 70 through the suction ports 60a and 60b, and delivers the lubricant oil from the delivery port 64, when the motor portion 54 is operated with a rotary motion about an axis CL. As a result, the lubricant oil is delivered to the gears and the planetary gear sets accommodated within the transmission 20, and the pressure of the lubricant oil is applied to the transmission 20 so as to be shifted to the selected operating position. The suction ports 60a and 60b are provided with respective strainers (not shown). The pump portion 56 is a known pump such as: an internal or gerotor gear pump wherein a driven gear is rotated by a drive gear to deliver a pressurized lubricant oil from a gap between the driven and drive gears; an axial piston pump wherein a swash plate presses a piston with a rotary motion of the motor portion 54, to deliver a pressurized lubricant oil; and a vane pump wherein vanes are rotated with the rotary motion of the motor portion 54, to deliver a pressurized lubricant oil. The motor portion 54 and the pump portion 56 have the common axis CL and are formed integrally with each other. The motor portion 54 may be any one of various known motors such as a brushless type DC motor.

The driver portion 52 incorporates a drive control circuit including semiconductor elements for controlling the operation of the motor portion 54, and is formed integrally with the motor portion 54. The driver portion 52 is installed such that a part of the driver portion 52 above a broken line in FIG. 3 is positioned above or outside the casing 41, for preventing overheating of the driver portion 52 due to a temperature rise within the casing 41. The entirety of the pump portion 56, and a part of the motor portion 54 below the broken line in FIG. 3 are disposed within the space defined by the flange portion 42 of the casing 41 and the oil pan 70. The electric oil pump device 50 has two holder portions 62a and 62b, and is fixed with bolts or any other fixing means to the casing 41 at the two holder portions 62a and 62b.

Figure 4:
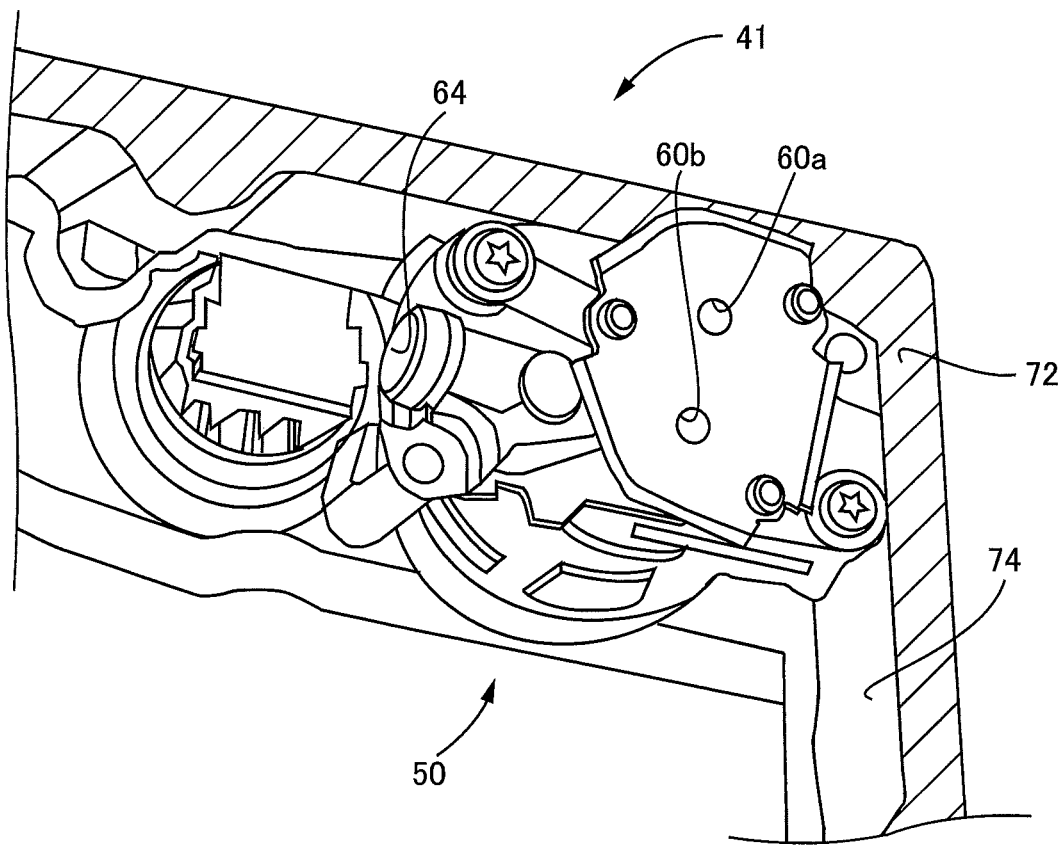
FIG. 4 is a perspective view showing the electric oil pump device assembled with a casing of FIG. 2, as seen in a direction away from an oil pan.

FIG. 4 is the perspective view of the electric oil pump device 50 fixed to the casing 41, as seen in a direction from the oil pan 70. Hatching lines in FIG. 4 indicate the above-described contact surface 72 of the casing 41 held in contact with the oil pan 70. The casing 41 includes a side wall 74 which is located adjacent to the contact surface 72. The pump portion 56 and a portion of the motor portion 54 of the electric oil pump device 50 are disposed on the side of the oil pan 70. The electric oil pump device 50 has the suction ports 60a and 60b formed through a bottom portion of the electric oil pump device 50 on the side of the oil pan 70, so that the lubricant oil is sucked into the pump portion 56 through the suction ports 60a and 60b. The electric oil pump device 50 also has the delivery port 64 located on the left side of the suction port 60b, as seen in FIG. 4, so that the lubricant oil is delivered from the delivery port 64.

According to the present embodiment, the electric oil pump device 50 for the vehicle 10 having the engine 12 and the gear device in the form of the transmission 20 through which the vehicle drive force of the engine 12 is transmitted is provided to deliver the lubricant oil to the transmission 20, and to generate the hydraulic pressure for controlling the transmission 20. The electric oil pump device 50 includes the pump portion 56 for delivering the lubricant oil, the motor portion 54 for operating the pump portion 56, and the driver portion 52 for controlling the operation of the motor portion 54. The pump portion 56, the motor portion 54 and the driver portion 52 are formed integrally with each other, or the driver portion 52 is disposed adjacent to the motor portion 54. The pump portion 56 and a part or the entirety of the motor portion 54 are disposed within the space defined by the oil pan 70 and the casing 41 which accommodates the transmission 20, while the driver portion 52 is disposed in the outside space outside the casing 41 and the oil pan 70. Accordingly, a volume of a part of the electric oil pump device 50 which is located in the above-indicated outside space can be reduced, so that a need for space saving of the vehicle 10 can be met. In addition, the driver portion 52 disposed in the outside space outside the casing 41 and the oil pan 70 is less likely to be exposed to heat of the lubricant oil stored within the oil pan 70, so that a requirement of the electric oil pump device 50 to use costly high heat-resistant electronic components is reduced, whereby the cost of manufacture of the electric oil pump device 50 can be reduced.

The present embodiment is further configured such that the driver portion 52 is disposed in a part of the outside space outside the casing 41 and the oil pan 70, which part is located upwardly of the oil pan 70 and sideways of the transmission 20. Accordingly, the electric oil pump device 50 can be installed on the vehicle 10, by utilizing a space which tends to be a dead space for installation of the engine 12 and the transmission 20 on the vehicle 10.

The present embodiment is also configured such that the driver portion 52 is disposed in a part of the outside space outside the casing 41 and the oil pan 70, which part is located between the casing 41 and the front propeller shaft 24 to which the vehicle drive force is transmitted from the gear device in the form of the transmission 20. In the 4-wheel-drive vehicle 10 provided with the front propeller shaft 24, therefore, the space between the front propeller shaft 24 and the casing 41 which tends to be a dead space can be effectively utilized for installation of the electric oil pump device 50.

While the preferred embodiment of this invention has been described in detail by reference to the drawings, it is to be understood that the invention may be otherwise embodied. For instance, an internal combustion engine in the form of the engine 12 provided as the drive power source of the vehicle 10 in the illustrated embodiment may be replaced by an electric motor. Further, the transmission 20 having a plurality of speed positions in the illustrated embodiment may be replaced by a transmission having a single fixed speed ratio for reducing an input speed thereof.

In the illustrated embodiment, the driver portion 52 of the electric oil pump device 50 is disposed in the outside space outside the casing 41 and the oil pan 70, and is disposed so as to extend upwards from the flange portion 42 of the casing 41. However, the electric oil pump device 50 need not be disposed so as to extend upwards from the flange portion 42. For example, the driver portion 52 integral with the motor portion 54 and the pump portion 56 may be fixed to a side surface of the oil pan 70 or the casing 41.

While the preferred embodiments and modifications have been described for illustrative purpose only, it is to be understood that the present invention may be embodied with various other changes and improvements, which may occur to those skilled in the art.

NOMENCLATURE OF ELEMENTS

10: engine (drive power source)
20: transmission (gear device)
24: front propeller shaft
41: casing
50: vehicular electric oil pump device
52: driver portion
54: motor portion
56: pump portion
70: oil pan

What is claimed is:

1. An electric oil pump device for a vehicle including a drive power source and a gear device through which a vehicle drive force of the drive power source is transmitted, the electric oil pump device delivering a lubricant oil to the gear device, and generating a hydraulic pressure for controlling the gear device, the electric oil pump device comprising:
   a pump portion for delivering the lubricant oil;
   a motor portion for operating the pump portion; and
   a driver portion for controlling an operation of the motor portion,
   wherein the pump portion, the motor portion and the driver portion are formed integrally with each other, or the driver portion is disposed adjacent to the motor portion,
   the pump portion and a part or an entirety of the motor portion are disposed within a space defined by an oil pan and a casing which accommodates the gear device, and
   the driver portion is disposed in an outside space outside the casing and the oil pan.

2. The electric oil pump device according to claim 1, wherein the driver portion is disposed in a part of the outside space outside the casing and the oil pan, which part is located upwardly of the oil pan and sideways of the gear device.

3. The electric oil pump device according to claim 1, wherein the driver portion is disposed in a part of the outside space outside the casing and the oil pan, which part is located between the casing and a front propeller shaft to which the vehicle drive force is transmitted from the gear device.

4. The electric oil pump device according to claim 2, wherein the driver portion is disposed in a part of the outside space outside the casing and the oil pan, which part is located between the casing and a front propeller shaft to which the vehicle drive force is transmitted from the gear device.

* * * * *